US008858765B2

(12) United States Patent  (10) Patent No.: US 8,858,765 B2
Sano et al.  (45) Date of Patent: Oct. 14, 2014

(54) ACIDIC ELECTROLYZED WATER PRODUCTION SYSTEM AND GENERATION CONTROL METHOD

(75) Inventors: Yoichi Sano, Zushi (JP); Barry R. Taylor, Adrian, MI (US)

(73) Assignee: Ecolab USA Inc., Saint Paul, MN (US)

( * ) Notice: Subject to any disclaimer, the term of this patent is extended or adjusted under 35 U.S.C. 154(b) by 1534 days.

(21) Appl. No.: 11/438,454

(22) Filed: May 22, 2006

(65) Prior Publication Data

US 2006/0260954 A1  Nov. 23, 2006

(51) Int. Cl.
*C25B 9/00* (2006.01)
*C25D 17/00* (2006.01)
*C25D 17/10* (2006.01)
*C25C 7/00* (2006.01)
*C02F 1/461* (2006.01)

(52) U.S. Cl.
CPC ... *C02F 1/46109* (2013.01); *C02F 2001/46185* (2013.01); *C02F 2201/46115* (2013.01)
USPC ........ 204/242; 204/626; 204/232; 204/228.6; 204/528

(58) Field of Classification Search
CPC .......... C25B 9/00; C25D 17/00; C25D 17/10; C25C 7/00
USPC ................ 204/242, 193, 194, 422, 626, 232, 204/228.6, 528; 205/101, 392, 584, 650, 205/674
See application file for complete search history.

(56) References Cited

U.S. PATENT DOCUMENTS

| 3,616,355 | A | | 10/1971 | Themy et al. |
| 3,975,246 | A | | 8/1976 | Eibl et al. |
| 4,290,864 | A | * | 9/1981 | Shuster et al. ................ 205/482 |

(Continued)

FOREIGN PATENT DOCUMENTS

| EP | 1 103 636 A | | 5/2001 |
| JP | 11100688 | * | 4/1999 |
| JP | 11100688 A2 | | 4/1999 |
| JP | 2001-286868 | | 10/2001 |

OTHER PUBLICATIONS

English Translation of foreign reference JP 11-100688; Sano, Yoichi; Apr. 13, 1999.*

*Primary Examiner* — James Lin
*Assistant Examiner* — Zulmariam Mendez
(74) *Attorney, Agent, or Firm* — McKee, Voorhees & Sease (57) ABSTRACT

An improved device and method for the creation of acidic electrolyzed water is described. The device has an flow-through anode chamber and a static cathode chamber. The static cathode chamber contains a fixed amount of salt-containing electrolyte, which is renewed as needed. The flow rate of water through the anode is restricted to a range of about 5 to 40 ml per ampere of current passed through the electrode. Electrolyzed water flowing from the anode is diluted to obtain the desired concentration of hypochlorous acid, and is collected in a tank or other vessel. The electrolysis reaction is terminated when a preset amount of current has passed through the anode. Water circulation may be one pass or recycling. In a preferred embodiment, the membrane is anion-selective. Preferably, the membrane and the electrodes are integrated into a preassembled format that can be attached to the anode and cathode compartments via flanges or similar devices allowing quick replacement of an electrode assembly in an electrolyzer. The anion-permeable membrane can be protected by a protection membrane, in which are provided slits or other discontinuities to allow venting of gas.

7 Claims, 3 Drawing Sheets

(56) References Cited

U.S. PATENT DOCUMENTS

| | | | |
|---|---|---|---|
| 4,466,878 A * | 8/1984 | DiNitto et al. ............... 204/415 |
| 5,589,052 A | 12/1996 | Shimamune et al. |
| 5,674,365 A | 10/1997 | Sano |
| 5,858,201 A | 1/1999 | Otsuka et al. |
| 5,897,757 A * | 4/1999 | Sano ............................ 204/284 |
| 5,965,009 A | 10/1999 | Shimamune et al. |
| 6,096,177 A | 8/2000 | Kamitani et al. |
| 6,126,796 A | 10/2000 | Shimamune et al. |
| 6,143,163 A | 11/2000 | Sawamoto et al. |
| 6,187,154 B1 | 2/2001 | Yamaguchi et al. |
| 6,235,186 B1 | 5/2001 | Tanaka et al. |
| 6,464,845 B2 | 10/2002 | Shirota et al. |
| 6,524,450 B1 | 2/2003 | Hara |
| 6,585,867 B1 | 7/2003 | Asano |
| 6,905,580 B2 | 6/2005 | Kurokawa et al. |
| 7,090,753 B2 | 8/2006 | Sumita |
| 7,238,272 B2 | 7/2007 | Sano |
| 2004/0020787 A1 | 2/2004 | Sano |
| 2004/0055896 A1 | 3/2004 | Anderson et al. |
| 2004/0060815 A1 | 4/2004 | Buckley et al. |

* cited by examiner

Figure 3

ACIDIC ELECTROLYZED WATER PRODUCTION SYSTEM AND GENERATION CONTROL METHOD

PRIORITY

This application is a continuation-in-part of, and claims the benefit of the priority of, co-pending Japanese applications JP 2005-175654 and JP 2005-147,482, each filed May 20, 2005, and each of which is hereby incorporated by reference in its entirety.

FIELD OF THE INVENTION

This invention relates to a method for the production of hypochlorous acid-bearing acidic electrolyzed water, to an apparatus for such production, and to a control method for said production.

BACKGROUND

Batch type production formats are known that generate hypochlorous acid-bearing acidic electrolyzed water, using raw water that has been stored in a vessel having a fixed capacity. These formats use an electrolysis tank in which the positive electrode chamber and the negative electrode chamber have been divided by a separation membrane. The electrolysis is done in the positive electrode chamber and the negative electrode chamber, using water for electrolytic processing that has had a small amount of a chloride-containing salt added to it to form the electrolyte. Typically, flow through an anode compartment generates acid electrolyzed water, and flow through a cathode compartment generates alkaline electrolyzed water.

However, there are many problems with this approach. In particular, although acidic electrolyzed water possesses strong bactericidal power, and is a desirable water that causes little contamination of people or the environment, the production systems of the past have weaknesses such as the fact that the resulting acidic water contains salt, has a strong smell of chlorine, and easily corrodes metals. In addition, from the standpoint of the production process, there are troublesome cases in which the generation of alkaline water creates problems. In the marketplace, devices that generate salt-free acidic electrolyzed water without generating alkaline water are not readily available. Finally, in some production systems that employ a cation exchange membrane, the presence of some cations in the salt can foul the ion-selective membrane. Consequently, restrictions are placed on the purity of the electrolyte salt that limit the possible grades of salt that can be used in such systems.

A system is desired with which stable, reproducible generation of acidic electrolyzed water can be done, where the generation of alkaline water can be avoided or minimized, and where limits on the impurity content of the electrolyte salt can be relaxed.

Problems of the Prior Art to be Solved by the Invention

This invention relates to a method of generating electrolyzed water, in which acidic electrolyzed water is generated while generating little or no alkaline electrolyzed water, and in which no salt is contained in the generated water. Thereby, electrolyzed water is generated for which the chlorine smell is low. The electrolysis tank (electrolyzer) contains no cation exchange membrane, so impurity requirements for the electrolyte salt are relaxed. Moreover, the installation and removal of the electrodes is simple, and further, it is possible to generate, in a short period of time, acidic electrolyzed water that reproducibly exhibits targeted physical properties.

In Japanese patent JP 3,113,645, by the inventor of the present invention, the chloride concentration in the water in the anode chamber is increased by limiting the flow rate of water through the positive electrode (anode) chamber to a rate of 5 to 40 cc per minute per ampere of current. This increases the efficiency of chlorine production on the surface of the positive electrode (anode). The conversion of chlorine to hypochlorous acid is promoted by mixing the electrolyzed water with additional water after the electrolyzed water leaves the anode compartment. Consequently, the amount of chlorine that escapes from the generated water is reduced, and the smell of chlorine is made low.

A method that generates acidic electrolyzed water that does not include any salt content, and while generating very limited amounts of alkaline electrolyzed water, is described in Japanese Patent Number 3,551,288 by the inventor of the present invention for a system in which the acidic water is stagnant.

SUMMARY OF THE INVENTION

The present invention is an improvement over the above art. In one improvement, as the means with which hypochlorous acid-bearing acidic electrolyzed water having a low chlorine smell is generated efficiently, means are provided in which an extremely limited amount of raw water is introduced, by a liquid distribution device, into the positive electrode chamber. Chloride ions are selectively introduced into the water in the positive electrode (anode) chamber in close proximity to the anode through an anion selective membrane. The limited amount of raw water is electrolyzed there, and then it is removed from the positive electrode chamber and mixed with non-electrolyzed water. For selecting the amount of raw water that is introduced into the positive electrode chamber to be treated, a flow rate of 5 to 40 cc per minute per ampere of current is preferred.

The positive electrode (anode) and negative electrode (cathode) chambers are separated by an anion selective membrane. The salt electrolyte is contained in the form of a solution in the negative electrode (cathode) chamber. The electrolyte is preferably highly concentrated, and may contain undissolved salt.

In addition, to make the attachment and removal of the electrodes simple, means are provided in which the positive and negative electrode plates and the separating membrane have been integrated into a single unit, that is held between flanges or other attachment means that have been attached to the negative electrode chamber and the positive electrode chamber. As described in JP 3,551,288 for a non-integrated membrane, the membrane in the integrated unit may be a non-ion selective membrane or an anion-selective membrane, and preferably is an anion-selective membrane, of any of the types known in the art.

Also, as a means with which the generated water that accurately exhibits the target physical properties can be produced in a short period of time, an embodiment is provided in which the end of the electrolysis process is determined by integrating the current over time, for example collecting values determined at fixed time intervals, such as each second, and then terminating the electrolysis when the total amount of electricity supplied to the cell reaches a selected value. The selected value will depend on various factors, including the desired final level of active chlorine (hypochlorous acid plus hypochlorite ion plus chlorine gas) or equivalent in the electrolyzed water, and the activity efficiency of the electrodes surfaces toward the various electrolysis reactions and their catalysts. In one embodiment, the selected value is in the range of 420±200 coulombs per liter of raw water that is processed. An alternative embodiment is a format for use in those cases where the current is stable to some degree, where a timer is used instead of integrating the current, and the time is regulated.

In another embodiment, the present invention is a batch type acidic electrolyzed water production system characterized in that the system uses an electrolyte cell having an easily removable electrode assembly with a unitary, integrated structure, in which the positive and negative electrode plates, and the separating membrane that is in between these plates, are arranged in a layered assembly, and connected, using a flange or the like, in between the positive electrode chamber and the negative electrode chamber.

DETAILED DESCRIPTION OF THE INVENTION

Figure 1:
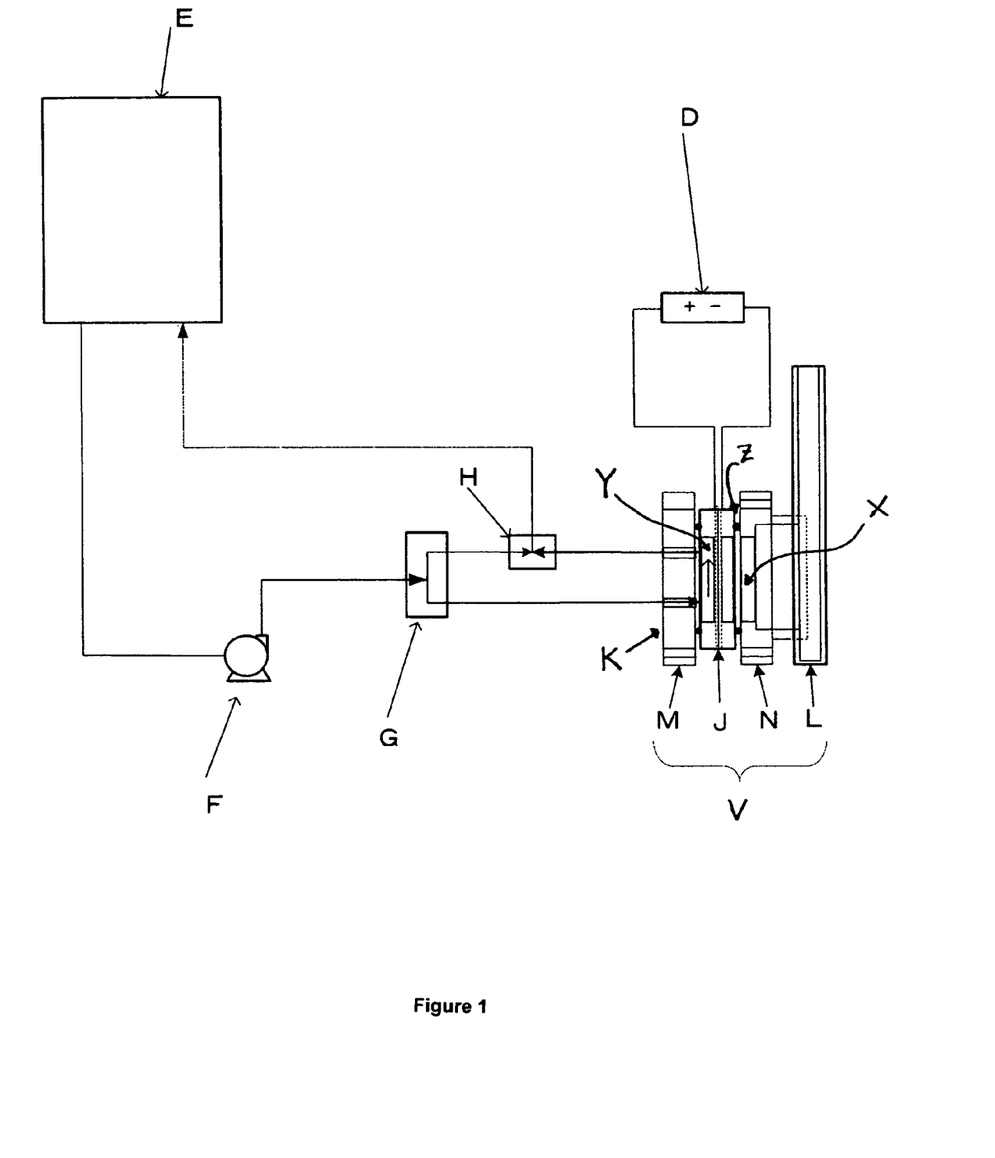
FIG. 1 is an overall flow diagram of the water electrolysis system for one embodiment of the present invention.

An example of the batch type water electrolysis system of the present invention is shown in FIG. 1. FIG. 1 is a line diagram in which the water electrolysis system is shown. In this embodiment, the electrolysis system has an assembled electrolyzer assembly (V), which has been furnished with an electrolyte container (L) which is in fluid connection with the negative electrode chamber (cathode chamber) (X), which consists of the space inside frame (7) of integrated electrode assembly (J), and a space (12) cut into the face of flange (N). (Y) is the positive electrode chamber, formed in the space inside frame (7) of integrated electrode assembly (J), and optionally in a space (not illustrated) cut into the positive electrode chamber bounding plate (K). Flanges (M) and (N) are used to connect the two chambers (X) and (Y) and the electrode assembly (J), using fastener means such as bolts (see FIG. 2) to form the electrolyzer assembly (V). The direct current power source (D) is connected to said electrode assembly (J). (E) is a raw water tank, (F) is a circulation pump, (G) is a liquid distribution device, and (H) is a liquid mixing device. The water that has been delivered by the circulation pump (F) from the raw water tank (E) is distributed by the liquid distribution device (G) both to the water in the positive electrode chamber (Y), which is water that will be electrolyzed, and to liquid mixing device (H), which is water that will not be electrolyzed, but used to immediately dilute electrolyzed water that is leaving the electrolyzer assembly M. Both of the waters are mixed by the liquid mixing device (H) and, at the same time, the water and the chlorine gas that is generated in the positive electrode chamber are reacted, forming hypochlorous acid, and the mixture is returned once more to the raw water storage tank. A separate pump can be used for the distribution of water for electrolysis, instead of using a distribution device (G).

However, it should be noted that as a matter of convenience with regard to the layout of the piping, there are cases, which are not illustrated here, in which both of the waters are again returned to the raw water storage tank (E) without first mixing, i.e., in which there is no mixing device (H). There are other cases, not illustrated, in which the raw water storage tank is not the same as the tank that the electrolyzed water mixed with the non-electrolyzed water is stored in. It is not required that the raw water comes from a storage tank, such as tank (E); it could come from a continuous water source, and be regulated in amount by timing, weight or other means. The electrolysis time or charge is calculated, limited according to the result of the calculation, and the acidic electrolyzed water having the target effective chlorine concentration is thereby generated.

A salt for electrolysis, which is a chloride salt such as sodium chloride, potassium chloride or other chloride salt, is put into the electrolyte storage tank (L) of the negative electrode (cathode) (X). As the electrolysis of the electrolyte progresses, the chloride ions in the cathode move to the positive electrode (anode) chamber (Y) due to electrodialysis, and the chloride ions are replaced in the storage tank by hydroxyl ions, producing a hydroxide such as sodium hydroxide or the like. At some point, it is necessary to exchange the cathode solution with a fresh electrolyte solution before the chloride ions have disappeared, or before the alkalinity becomes excessive.

Figure 2:
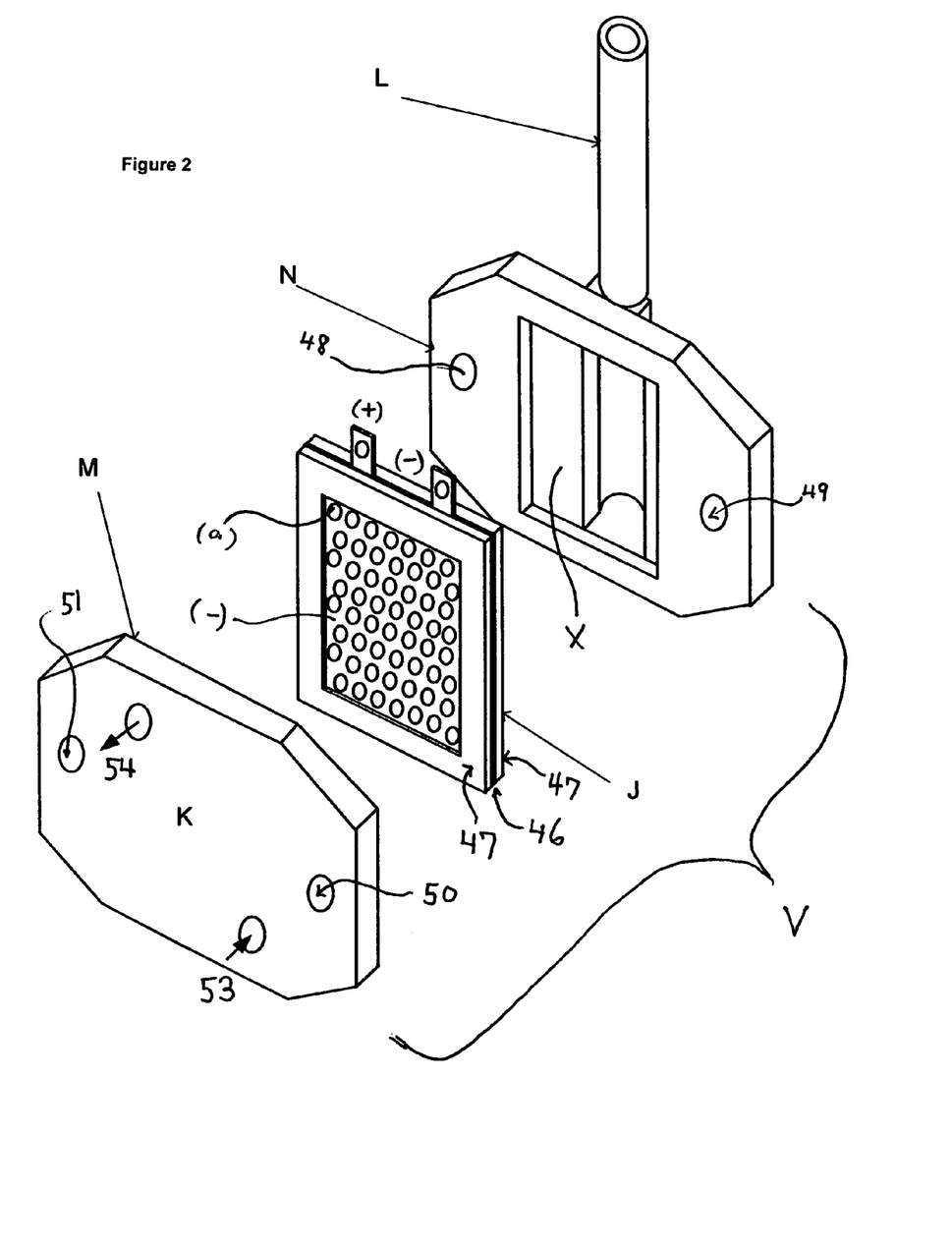
FIG. 2 is an oblique view drawing that shows the relationships among the components.

FIG. 2 shows a perspective drawing of a particular design of the electrolyzer assembly (V), which includes the negative electrode chamber (X), which may serve as the electrolyte storage tank, and the positive electrode chamber bounding plate (K) as well as the integrated electrode assembly (J), all of which are fastened together by the flanges (N) and (M) to form the electrolysis assembly (V). The integrated electrode assembly (J) is composed of a frame (47), a positive electrode (+), a membrane (46), a negative electrode (−) and a second frame (47). Other features of this embodiment are bolt holes 48, 49, 50, 51 in flanges M and N; and inlet (53) for raw water and outlet (54) for electrolyzed water in plate (K).

Figure 3:
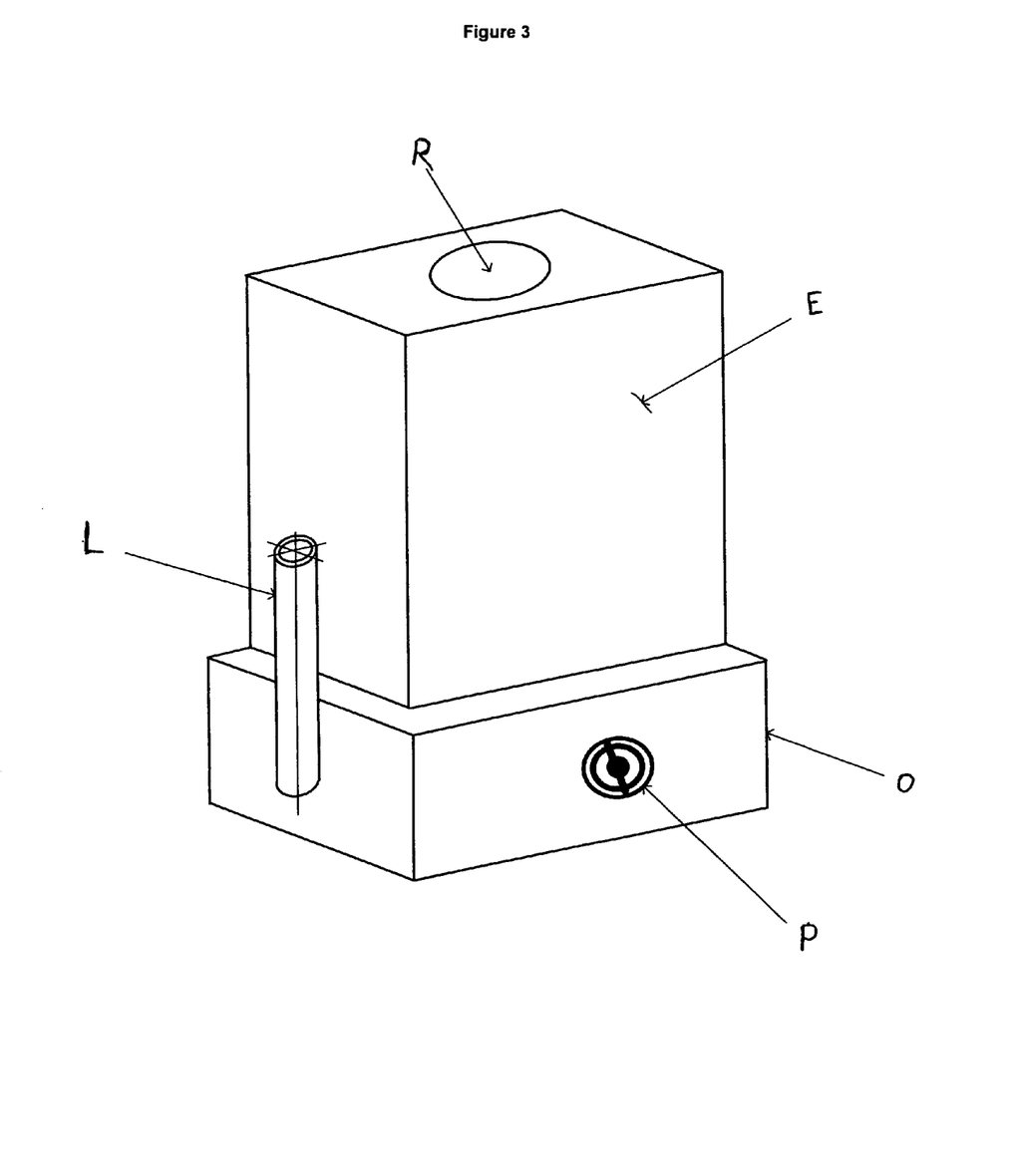
FIG. 3 is an exterior drawing of the batch type water electrolysis system of one embodiment of the present invention.

FIG. 3 is an exterior view drawing of one version of a complete batch type acidic electrolyzed water production system. (E) is the raw water tank, (L) is a portion of the negative electrode chamber/electrolyte storage tank shown in FIG. 2, (O) is a control box, also containing the pump (F) (not shown), (P) is the electrolysis control setting device or the timer, and (R) is the water supply orifice for placing water in the tank (E).

In a preferred embodiment, the electrolyte solution storage tank (L), connected to the cathode chamber (X), is a static system, in which the electrolyte solution is periodically replaced as its chlorine content is depleted. Electrolytes may include, but are not limited to, chlorides of alkali metals, such as sodium and potassium. Raw water is delivered from a raw water storage tank (E) that, in the illustrated embodiment, has a fixed capacity, by a pump (F). Then by means of a liquid distribution device (G), the raw water is distributed in part to the anode chamber (Y) as water that is electrolyzed and generates acidic electrolyzed water, and in part as other raw water not to be electrolyzed that is delivered so that it bypasses the anode. Only the amount of water that is electrolyzed in anode chamber (Y) is regulated at a flow rate of 5 to 40 cc per minute per ampere of current. After the electrolysis, the acidic electrolyzed water from the anode chamber (Y) is collected in a storage tank (E), which in this embodiment is the same as the supply tank. The acidic electrolyzed water may be diluted with other raw water after it leaves the anode the integrated electrode assembly (J), either by in-line dilution or by separate delivery of raw water to a storage tank. In one embodiment, the storage tank (E) for collection may be the same tank that originally contains the raw water for making the batch of acidic electrolyzed water. In this embodiment, some water passes through the anode chamber and is returned to the tank (E), and optionally other water is circulated by a pump, and returns to the tank without electrolysis, for example to promote efficient mixing. The electrolyzed and non-electrolyzed water may be mixed at any point after the acidic electrolyzed water has left the anode compartment, either directly in tank (E) or in a mixer (H).

It should be noted that while dilution of acid electrolyzed water after it leaves the anode compartment (Y) is possible and in some cases preferred, it is also possible to collect or use acid electrolyzed water without further dilution. One or both of the current and the residence time of water in the anode compartment has to be adjusted appropriately to provide the required final active chlorine concentration. (Active chlorine is the total chlorine present as any of hypochlorous acid, hypochlorite anion, and dimeric chlorine, all of which are in an equilibrium determined by pH and secondarily by other factors.)

In another embodiment, the present invention is a batch type acidic electrolyzed water production method, characterized by the use of a direct current power source (D) to provide electrical power to an electrolyzer, further characterized by the generation in an anode compartment (Y) of acidic electrolyzed water of known volume W liters, which may be contained in a tank, that is characterized by a known relationship between a target property in the volume W of acidic electrolyzed water, and the cumulative electric charge C (for example, in coulombs or ampere-seconds) required to achieve that property, and also characterized by the integration versus time of the electrical current passed through the electrolyzer assembly (V). When the integration value Q in the selected units is equal to the target value C, the generation of the acidic electrolyzed water is completed. The desired property is one that characterizes the usefulness of the acidic electrolyzed water. In one embodiment the property is the concentration of hypochlorous acid or of total active chlorine in the water in the collection tank, or in the stream of water leaving the anode compartment (Y). In another embodiment the property is the pH in the collection tank. The collection tank may be the same as the fixed volume supply tank (E), or may be a different tank (not illustrated.)

In another embodiment, the present invention is a batch type acidic electrolyzed water production method, characterized in that a direct current power source to provide a fixed current to an electrolysis tank. The processing time that is required for the time integral of the current that is passed through the electrolysis tank to reach a target value of C coulombs/liter (for the W liters in the storage tank having an active chloride level of U ppm) is calculated. The time is set with a timer, and the generation is terminated when the predetermined generation time is reached.

In one preferred embodiment, in which the target active chlorine level is about 30 ppm, the time required to apply about 420±200 coulombs per liter of water electrolyzed is calculated, the time is set with a timer, and the generation is terminated when the pre-selected value of total coulombs loaded is reached. The figure is derived from the multiplication of the desired level V of active chlorine (in parts per million) with a factor A. Factor A is in the range of about 8 to 20, in appropriate units, and is a measure of the efficiency of conversion of current flow through the membrane into production of hypochlorite from chloride. (In a perfectly efficient conversion, the value of A would be 1). In effect, the time required T may be calculated as $T+(AUW)/C$ Also, in order to make it such that the physical properties of the generated water can be produced simply and accurately, two methods are described. In a first method, the value of the electrolyzing current is integrated and the point in time at which the coulomb value per liter has reached a predetermined value is made the end point of the generation reaction. In a second method, a power source that can supply a fixed current or voltage is used, the mean electrolyzing current is sought in advance, the time that is required for the coulomb amount to reach the predetermined value is calculated, and the time is set with a timer. An example of a predetermined value is a number lying in the range of 420+/−200 (i.e., the range 220-620) coulombs per liter of water, but other predetermined values may be set depending on the desired concentration of hypochlorous acid in the product, on the efficiency of the particular electrolyzer, and on local regulations affecting the selected value, for example regulating the pH. These methods are judged to have advanced qualities with regard to the fact that straightforward and logical formats with which the amount of electricity per liter of raw water is regulated to be held constant have been utilized as suitable methods for the simple production of acidic electrolyzed water having an effective chlorine concentration, which is the target, with a batch type acidic electrolyzed water production system.

An additional advantage of the preferred embodiment described is that the simplicity of changing the electrode. Since the electrode has been integrated as a single unit (J), and is attached to the positive and negative electrode chambers by simple systems such as flanges (M, N) bolted together, the amount of work required to change the electrodes is considerably reduced.

Thus, in one embodiment, the present invention is a batch type acidic electrolyzed water production system characterized in that the system uses an electrolyte cell having an easily removable structure with an electrode having an integrated structure, in which the positive and negative electrodes and the separating membrane that is between these are arranged in proper order, and are enclosed by frames. The integrated electrode assembly is placed between the positive electrode chamber and the negative electrode chamber, which latter also serves as the electrolyte solution storage tank, and raw water is delivered from a raw water storage tank that has a fixed capacity with a pump, and by means of a liquid distribution device, is distributed as water that is electrolyzed to generate acidic electrolyzed water, and water that is not electrolyzed, and the amount of water that is electrolyzed is 5 to 40 cc per ampere of current, and after the electrolysis, both of the waters are again mixed and circulated to the raw water storage tank.

In another embodiment, a batch type acidic electrolyzed water production system is characterized in circulating water from a storage tank through an anode at limited flow rate, for example a flow rate of 5 to 40 ml per minute per coulomb of electricity applied to said anode, and the acidic electrolyzed water from the anode is diluted by its return to the storage tank and its mixture with the water contained in the storage tank.

In another embodiment, the storage tank is a detached container, for example a bottle, and water is removed from said bottle by a pump or equivalent connected to a first tube inserted into said bottle, and after electrolysis the acidic electrolyzed water is returned to said bottle by a second tube. When the designated time has passed, or a measured number of coulombs has been applied, then the tubes are removed and the bottle may be removed and closed.

In another embodiment, the raw water is supplied by a continuous source, preferably controlled by a valve, and the continuous raw water passes in a limited amount though the anode compartment, and optionally in another amount raw water bypasses the anode compartment and is mixed with the electrolyzed water after it leaves the anode compartment, either in line or in a receiving tank, which can be a fixed tank or an exchangeable tank.

In the batch-type electrolysis system, the salt solution in the cathode is generally changed in a batch type process, in which the salt solution is replaced after it has been used to generate a certain volume of acidic electrolyzed water having a target concentration of active chlorine, such as hypochlorous acid. The time before replacement could be extended, for example for the convenience of an operator, by circulating salt solution through the cathode compartment from a large tank, or from a tank containing undissolved salt, or both. In principle, electrolyte solution could be generated continuously by automatic means and circulated through the cathode compartment at a rate designed to maintain a particular chloride concentration in the electrolyte solution flowing out of the cathode compartment, in which case, if the anode compartment flow was also continuous, the system might not strictly speaking be a batch system.

In any of these embodiments the active chlorine concentration in the diluted electrolyzed water can be controlled by any practical combination of alteration of the ratio of diluting raw water to electrolyzed water, and altering the rate of flow of water (for example in ml/min) and/or the rate of current flow (amperes) in the anode compartment. (In any calculation, the influence of changes in the chloride concentration and pH in the cathode compartment on the efficiency A of the system should be considered for the most accurate results.)

In addition, the invention comprises a batch type acidic electrolyzed water production method characterized in that in those cases where acidic electrolyzed water for which the effective target chlorine concentration is about 30 ppm±20 is generated from the raw water of the raw water storage tank that has a fixed capacity (W liters), the current which is loaded is integrated each second and the generation is completed at the point in time where the integration value Q has reached the value that has been set, which may be a figure in the range of 420±200 coulombs per liter of water.

In addition, the invention comprises a batch type acidic electrolyzed water production method characterized in that a direct current power source is used to provide a fixed value for the current, or for the voltage with estimation of the current, and by means of the assumption in advance of the mean electrolytic current, the processing time that is required for the amount of the current that is loaded by one liter of raw water of the W liters to become 420±200 coulombs is calculated, the time is set with a timer, and the generation is completed.

In construction of the system of the invention, regulation of flow through the anode compartment is usually required. Any convenient known means of regulating flow can be used. Flow regulations means include, without limitation, valves, including needle valves, orifices, diaphragm pumps, piston pumps, other metering pumps, and capillary tubing.

In construction of the invention, any convenient means may be used to connect the flanges of the electrolyzer assembly. Besides bolts and nuts, as mentioned, clamps, screws, latches, snaps, straps, hook/loop closures, and other known fastening systems, and combinations of these, can be used.

In addition, the device of the invention may comprise means for determining when the salt solution in the cathode needs to be removed and replaced with a fresh salt solution. Any suitable determination means may be used. One means is by calculation, so that after a preset total number of coulombs of electricity are passed through the membrane, which corresponds to a total number of moles of chloride ion passed through the membrane when corrected for the efficiency, the device signals the operator that it is time to replace the salt solution. In an automated version, the device opens valves to remove the old salt solution and add fresh salt solution. In an alternative or supplementary mode of determination, a sensor is present in the cathode compartment and senses a value related to the level of chlorine. The value can be, among others, the pH, measuring the accumulation of hydroxyl ion, or it could be output from a chloride detector, or it could be a measurement of the redox potential of the cathode solution relative to a reference.

Likewise, for a batch operation, the time of termination of application of electric current to make acid electrolyzed water, and the time for termination of circulation of water through the anode, can be selected to occur upon the attainment of a criterion. Operation can also be contingent on the first of any of several criteria to be attained; or on a combination of criteria to be obtained, which may be weighted or otherwise mathematically interrelated. Criteria, which typically are the attainment of a value lower than, equal to, or greater than a selected value, can be any criterion of usefulness in selecting a particular level of antibiotic activity in the acid electrolyzed water. Preferred criteria include time of operation; integrated current during operation; pH; oxidation/reduction potential (ORP) (also called redox potential); concentration of active chlorine, for example by direct measurement, or a surrogate therefore; or change of color or other visible property of an indicator. "Water" as used herein means water of low salinity, and typically water of a grade useful and permissible for washing persons and animals, food items and other objects. Conventional additives can be added to water when such additives are electrochemically compatible with the presence of active chlorine in the final product.

Water, as noted, is preferably provided in a batch, but may be continuously replenished in one of several ways. Likewise, the chloride in the electrolyte is gradually expended, and the chloride concentration is maintained by one or more means selected from replacement of the electrolyte and replenishment of the electrolyte. For example, and with out limitation, the electrolyte may be replenished by one or more of recirculating the electrolyte in the cathode from and to a much larger external saline reservoir, or periodically adding salt to the electrolyte in the cathode, or periodically interrupting operation, discharging the electrolyte in the cathode, and refilling the cathode compartment with fresh electrolyte, or pumping electrolyte through the cathode chamber in a single pass mode at a regulated rate from another reservoir. Combinations of these may also be used, and pH may be adjusted independently of or concurrently with the replenishment of chloride ion.

Several embodiments of the invention have been illustrated or described. Additional embodiments are contemplated in the invention, and the scope of the invention is not limited by the description of particular embodiments, but by the scope of the claims.

The invention claimed is:

1. A device for producing acidic electrolyzed water with no salt in the generated water, the device comprising:
  an apparatus comprising an anode in an anode compartment, a cathode in a cathode compartment, an anion-permeable membrane separating the anode and the cathode compartment a protection membrane provided with slit-shaped discontinuities, the protection membrane functioning to protect the anion permeable membrane by allowing venting of gas, wherein the anode and cathode and membrane are formed in an integrated, unitary electrode assembly that is readily exchangeable, wherein water for electrolysis is circulated through the anode compartment one or more times and wherein the rate of flow of water for electrolysis through the anode compartment is regulated;

a chloride-containing electrolyte in the cathode compartment;

a direct current power source wherein a direct current voltage is applied between the anode and the cathode;

a raw water tank wherein the water for electrolysis is provided from the raw water tank;

a liquid distribution device;

a liquid mixing device;

a circulation pump wherein the water for electrolysis from the raw water tank is distributed by the circulation pump to the liquid distribution device wherein the water for electrolysis distributed into the liquid distribution device is further distributed both to the anode compartment to create electrolyzed water and to the liquid mixing device for non-electrolyzed water, wherein the non-electrolyzed water is used to immediately dilute the electrolyzed water;

a recycle loop;

wherein the liquid mixing device mixes the electrolyzed water and the non-electrolyzed water to create diluted electrolyzed water;

wherein the diluted electrolyzed water in the liquid mixing device is recycled back into the raw water tank;

wherein the diluted electrolyzed water is circulated in the recycle loop from the raw water tank to the anode compartment and back to the raw water tank one or more times to create the acidic electrolyzed water;

wherein the flow rate of the water for electrolysis through the anode compartment is between about 5 to about 40 ml/min per ampere of current passing between the anode and the cathode; and wherein the chloride-containing electrolyte in the cathode compartment is replaced after a preset number of coulombs from the direct current voltage are passed through the membrane.

2. The device of claim 1, wherein the rate of flow of water for electrolysis and the direct current voltage is deactivated when a coulomb value/liter has attained a pre-selected value and wherein the pre-selected value for the coulomb value/liter is determined by one or more criteria from the group consisting of elapsed time of operation, integrated current during operation, pH, oxidation/reduction (redox) potential, concentration of active chloride, change of color or other detectable property of an indicator.

3. The device of claim 1, wherein the amount of diluent non-electrolyzed water is selected to meet a pre-set concentration of active chlorine, a pre-set oxidation reduction potential, or a combination thereof.

4. The device of claim 3, wherein the pre-set oxidation reduction potential is in excess of 650 mV.

5. The device of claim 1, wherein the anion-permeable membrane is an anion-selective ion exchange membrane.

6. The device of claim 1, wherein the chloride-containing electrolyte in the cathode compartment is periodically or continually replenished to maintain a minimum chloride concentration, maximum pH, or a combination thereof.

7. The device of claim 1, wherein the membrane, the electrodes and the saline reservoir are formed in an integrated electrode assembly that is readily exchangeable.

* * * * *

UNITED STATES PATENT AND TRADEMARK OFFICE
CERTIFICATE OF CORRECTION

| | |
|---|---|
| PATENT NO. | : 8,858,765 B2 |
| APPLICATION NO. | : 11/438454 |
| DATED | : October 14, 2014 |
| INVENTOR(S) | : Yoichi Sano et al. |

It is certified that error appears in the above-identified patent and that said Letters Patent is hereby corrected as shown below:

In The Claims

Col. 8, Claim 1, Lines 58-59:
DELETE after water "with no salt in the generated water"

Col. 8, Claim 1, Line 63:
DELETE after ode "compartment a"
ADD after ode --compartment, a--

Col. 9, Claim 1, Line 32:
ADD after water; --and--

Col. 10, Claim 1, Lines 4-8:
DELETE after cathode "; and wherein the chloride-containing electrolyte in the cathode compartment is replaced after a preset number of coulombs from the direct current voltage are passed through the membrane"

Signed and Sealed this
Tenth Day of February, 2015

Michelle K. Lee
*Deputy Director of the United States Patent and Trademark Office*